(12) United States Patent
Hayashi

(10) Patent No.: US 8,070,350 B2
(45) Date of Patent: Dec. 6, 2011

(54) CLAY EXTRUDER

(75) Inventor: Shinzo Hayashi, Obu (JP)

(73) Assignee: NGK Insulators, Ltd., Nagoya (JP)

( * ) Notice: Subject to any disclaimer, the term of this patent is extended or adjusted under 35 U.S.C. 154(b) by 369 days.

(21) Appl. No.: 12/404,634

(22) Filed: Mar. 16, 2009

(65) Prior Publication Data

US 2009/0238911 A1 Sep. 24, 2009

(30) Foreign Application Priority Data

Mar. 19, 2008 (JP) ................................ 2008-070957

(51) Int. Cl.
*B28C 5/14* (2006.01)
(52) U.S. Cl. ............................ 366/88; 366/323; 425/208
(58) Field of Classification Search .................... 366/88, 366/323; 425/208
See application file for complete search history.

(56) References Cited

U.S. PATENT DOCUMENTS

| | | | | |
|---|---|---|---|---|
| 333,788 | A | * | 1/1886 | Smout ............................... 99/524 |
| 687,915 | A | * | 12/1901 | Chambers ...................... 425/208 |
| 766,260 | A | * | 8/1904 | Jaques ........................... 425/208 |
| 2004/0062827 | A1 | | 4/2004 | Yamaguchi et al. |
| 2005/0073906 | A1 | | 4/2005 | Hayashi |

FOREIGN PATENT DOCUMENTS

| | | |
|---|---|---|
| CN | 2539617 | 3/2003 |
| FR | 1 226 955 A | 8/1960 |
| JP | A-7-9423 | 1/1995 |
| JP | A-9-94818 | 4/1997 |
| JP | A-10-100131 | 4/1998 |
| JP | A-2005-66946 | 3/2005 |
| JP | A-2006-224563 | 8/2006 |

OTHER PUBLICATIONS

Search Report issued in corresponding European Patent Application No. 09250741.7 dated Apr. 6, 2011.

* cited by examiner

*Primary Examiner* — David Sorkin
(74) *Attorney, Agent, or Firm* — Oliff & Berridge, PLC

(57) ABSTRACT

The clay extruder includes a drum 2 having a screw 4 having a rotary shaft 6, a spiral rotary blade 5 for feeding the clay under pressure while kneading the clay fed into the screw, a pressure raising portion 10 to feed the clay under pressure while kneading the clay, and a rectifying portion 11 provided on the side of an extrusion port 20 in the drum 2 to rectify the clay into a columnar shape. The rectifying portion 11 has a rectifying rotary blade 7 whose intervals being longer than that of the rotary blade; an angle formed between the face on the side of the extrusion port in a sectional shape of the rectifying rotary blade cut along the central line of the rotary shaft 6 and the central line gradually decreases, as the rectifying rotary blade comes close to the extrusion port.

7 Claims, 11 Drawing Sheets

CLAY EXTRUDER

BACKGROUND OF THE INVENTION

1. Field of the Invention

The present invention relates to a clay extruder which is preferably used in manufacturing a columnar or a rectangular-columnar article including, for example, a ceramic raw material or the like. More particularly, it relates to a clay extruder capable of preventing the unevenness of a clay density caused by the rotation of a screw in the clay extruder to obtain a satisfactory a columnar or a rectangular-columnar article having high homogeneity.

2. Description of the Related Art

Heretofore, there have been known various extruders, which are used for kneading and homogenizing a clay including, for example, a ceramic material by the rotation of a screw in a drum to prepare a columnar or a rectangular-columnar article (e.g., see JP-A-9-94818 and JP-A-10-100131).

FIG. 2 is a schematic constitution diagram showing one example of a conventional clay extruder. In the conventional clay extruder, as shown in FIG. 2, a drum 2 has a structure in which a screw 34 is provided. A large shearing force is imparted to a clay fed from a supply port 19 into the drum 2 by the screw 34 in the drum 2, to knead and homogenize the clay. Then, the clay kneaded and homogenized in the drum 2 is extruded from an extrusion port 20 to manufacture a kneaded clay columnar article 31.

Moreover, as a manufacturing method of a ceramic honeycomb formed article, there is known a method of blending a ceramic material, water, a binder and the like; then preparing a large muddy lump as the clay by a kneader; degassing, kneading and homogenizing the clay by use of a clay extruder; preparing the columnar article by extrusion; and manufacturing a ceramic honeycomb formed article from this a columnar or a rectangular-columnar article by extrusion forming (a plunger type forming machine).

In this case, the columnar article is prepared by the clay extruder, but the density of the clay partially becomes uneven by the rotation of the screw of the clay extruder. Moreover, when a ceramic honeycomb structure is formed by extrusion using the columnar article, various formed article defects are generated.

Especially in recent years, the thinning of partition walls in the ceramic honeycomb structure has farther progressed. To prepare the ceramic columnar article for use in the formed article having such thin walls, homogeneity is remarkably intensely demanded, and the manufacturing steps of the columnar article need to be contrived to satisfy strict quality control requirements.

When the preparation of the ceramic honeycomb structure by the extrusion forming is performed by using the columnar article obtained by the conventional clay extruder having the structure shown in FIG. 2, unevenness is generated in the clay density of the columnar article by the rotation of the screw in the clay extruder, and the forming defect of the honeycomb structure is sometimes generated.

FIG. 3 is a schematic explanatory view showing a tip structure of the screw 34 of a conventional clay extruder 30 shown in FIG. 2. FIG. 4 is a schematic explanatory view showing the density distribution of a clay in a part shown by a broken line part A of FIG. 3. In FIG. 4, a dark part indicates a highly dense state, and a bright part indicates a lowly dense state. The abscissa indicates a rotary shaft direction of the screw 34 (an extruding direction 41), and the ordinate indicates a drum diametric direction 42. A hatched region shown in FIG. 4 shows a section of the screw 34. As shown in FIG. 4, in an abscissa direction, a portion of the clay which directly receives a thrust force generated by the rotation of a rotary blade 35, that is, the clay which comes in contact with the face of the rotary blade 35 in the extrusion direction 41 is highly densified (a broken line part B). In an ordinate direction, when the clay moves following the rotation of the screw in the drum 2, a force is applied to the centrifugal direction of the drum diametric direction 42, and a frictional force between the clay and a drum inner wall 43 is generated, so that the clay which comes in contact with the drum inner wall 43 is highly densified. Moreover, the density of the clay lowers in the periphery of a rotary shaft 36 and near the face of the rotary blade 35 opposite to the extrusion direction 41 (a broken line part C).

Therefore, when the extrusion forming and the subsequent firing of the ceramic honeycomb structure are performed by using the columnar or columnar rectangular clay article obtained by the conventional clay extruder 30 as shown in FIGS. 2 and 3, the density in the columnar or columnar rectangular clay article is uneven for the above reason, and hence various formed article defects or firing defects might be generated.

For example, FIG. 5 is a schematic sectional view from the side surface of the columnar or columnar rectangular clay article 31 obtained by using the clay extruder 30 including the conventional screw tip structure of FIG. 3. As shown in this drawing, flow patterns 17 rotationally symmetrical with respect to a central line 16 of the columnar or columnar rectangular clay article 31 and curved in the extrusion direction 41 are formed owing to the density difference inside the clay.

FIG. 6 is an enlarged schematic sectional view of the flew pattern in a broken line part D of FIG. 5 near the central line 16 of the columnar or columnar rectangular clay article 31. In a structure shown in the drawing, a highly dense clay portion and a lowly dense clay portion are alternately laminated before and after the curved flow pattern 17 with respect to the central line 16.

SUMMARY OF THE INVENTION

The present invention has been developed in view of the above conventional problem, and an object thereof is to provide a clay extruder capable of obtaining a satisfactory a columnar or a rectangular-columnar article having high homogeneity by the rotation of a screw in a drum of a clay extruder, and a manufacturing method of the columnar article.

The present inventor has intensively performed investigation for solving the above problem, and has found that the above object can be achieved by adopting the following constitution, to complete the present invention. That is, the present invention is as follows.

[1] A clay extruder comprising: a drum including a supply port for feeding a clay, an extrusion port through which the clay is extruded to form a columnar or a rectangular-columnar article, and a screw having a rotary shaft and a spiral rotary blade extending along the rotary shaft, to feed the clay under pressure while kneading the clay fed into the screw by the rotation of the rotary blade, wherein the screw has a pressure raising portion provided on the side of the supply port in the drum to feed the clay under pressure while kneading the clay, and a rectifying portion provided on the side of the extrusion port in the drum to rectify the spiral clay fed under pressure along the rotary shaft into a columnar shape, the rectifying portion has a rectifying rotary blade provided so that an angle formed between the face on the side of the extrusion port in a sectional shape of the rectifying rotary blade cut along a plane extending along the central line of the rotary shaft and the central line of the rotary shaft gradually decreases, as the rectifying rotary blade comes close to the extrusion port, and the interval of the rectifying rotary blade in the rotary shaft direction is longer than that of the rotary blade of the pressure raising portion in the rotary shaft direction.

[2] The clay extruder according to the above [1], wherein the interval of the rectifying rotary blade in the rotary shaft direction gradually increases, as the rectifying rotary blade comes close to the extrusion port.

[3] The clay extruder according to the above [1] or [2], wherein the rectifying rotary blade constituted of two blade members are provided so that the sectional shapes of the blade members cut along a direction vertical to the rotary shaft are rotationally symmetrical with respect to the central line of the rotary shaft.

[4] The clay extruder according to any one of the above [1] to [3], wherein the rectifying rotary blade is provided so that the sectional shape of the rectifying rotary blade cut along the direction vertical to the rotary shaft is gradually reduced outwardly in the diametric direction of the drum, and expands along an inner wall of the drum, as the rectifying rotary blade comes close to the extrusion port.

[5] The clay extruder according to any one of the above [1] to [4], wherein the rectifying rotary blade is provided so that the sectional shape of the rectifying rotary blade cut along the direction vertical to the rotary shaft is gradually reduced outwardly in the diametric direction of the drum, and expands along the inner wall of the drum, as the rectifying rotary blade comes close to the extrusion port, and so that the sectional shape becomes circular arc in the extrusion port.

[6] The clay extruder according to any one of the above [1] to [5], wherein the volume of the clay fed under pressure to the extrusion port is kept at a constant level for one cycle of the rotation of the rectifying rotary blade in a range of 5 to 30 cm from the extrusion port.

According to the clay extruder of the above constitution [1], on the extrusion port side of the clay extruder, the screw has the rectifying portion including the rectifying rotary blade. Moreover, the rectifying rotary blade is provided so that the angle formed between the face on the extrusion port side in the sectional shape of the rectifying rotary blade cut along the plane extending along the central line of the rotary shaft and the central line of the rotary shaft gradually decreases, as the rectifying rotary blade comes close to the extrusion port. In consequence, it is possible to decrease a problem that a density difference is generated in the clay and the clay becomes uneven owing to the thrust force of the rotary blade. When the angle between the rectifying rotary blade and the central line of the rotary shaft is decreased, the curving of a flow pattern in the columnar article can be decreased.

According to the above constitution [2], the rectifying rotary blade is provided so that the interval of the rectifying rotary blade in the rotary shaft direction gradually increases, as the rectifying rotary blade comes close to the extrusion port. Therefore, the clay spirally moving along the rotary blade in the drum can be prevented from being spirally piled up and integrated. When the interval of the rectifying rotary blade increases, the clay spirally moving in the pressure raising portion is rectified into the homogeneous a columnar or a rectangular-columnar article having an only smaller density difference in the rectifying portion.

According to the above constitution [3], the sectional shapes of the rectifying rotary blade members cut along the direction vertical to the rotary shaft are rotationally symmetrical with respect to the central line of the rotary shaft. In consequence, the flow patterns due to the density difference of the columnar article are rotationally symmetrical. Moreover, since the rectifying rotary blade members are rotationally symmetrically arranged, it is possible to decrease the risk of device failure due to contact between the rotary blade and the drum owing to the eccentricity of the rotary blade during the thrusting of the clay.

According to the above constitution [4], the rectifying rotary blade is provided so that the sectional shape of the rectifying rotary blade cut along the direction vertical to the rotary shaft is gradually reduced outwardly in the diametric direction of the drum, and expands along the inner wall of the drum, as the rectifying rotary blade comes close to the extrusion port. Therefore, in the sectional shape of the rectifying rotary blade cut along the direction vertical to the rotary shaft, a region where the rectifying rotary blade shears the clay in the drum decreases, and the density unevenness can be decreased.

According to the above constitution [5], the rectifying rotary blade is provided so that the sectional shape of the rectifying rotary blade cut along the direction vertical to the rotary shaft is gradually reduced outwardly in the diametric direction of the drum, and expands along the inner wall of the drum, as the rectifying rotary blade comes close to the extrusion port, and so that the sectional shape becomes circular arc in the extrusion port. Therefore, friction in the face where the rectifying rotary blade comes in contact with the clay decreases, and the forming properties of the columnar article can be improved.

According to the above constitution [6], the volume of the clay fed under pressure to the extrusion port is kept at a constant level for one cycle of the rotation of the rectifying rotary blade in a range of 5 to 30 cm from the end of the extrusion port. In consequence, it can be prevented that the clay is starved at the tip of the rectifying rotary blade, is laminated in the screw and generates a clay coarse portion. In the range of 0 to 5 on from the end of the extrusion port, the clay is substantially columnar, and the clay hardly needs to be fed under pressure or rectified in this range.

According to the clay extruder of the present invention, the unevenness of the clay density during the rotation of the screw in the clay extruder can be prevented to obtain a satisfactory a columnar or a rectangular-columnar article having high homogeneity. Moreover, in a case where the preparation of the columnar article by extrusion forming is performed to obtain the ceramic honeycomb structure, the ceramic honeycomb structure which does not have any defect can easily be manufactured.

DESCRIPTION OF REFERENCE NUMERALS

1: clay extruder, 2: drum, 4: screw, 5: rotary blade, 6: rotary shaft, 7: rectifying rotary blade, 9: rotary shaft central line, 10: pressure raising portion, 11: rectifying portion, 14: clay diametric direction, 15: a columnar or a rectangular-columnar article, 16: a columnar or a rectangular-columnar article central line, 17: flow pattern, 18: test piece, 19: supply port, 20: extrusion port, 24: screw rotating direction, 30: clay extruder, 31: clay (a columnar or columnar rectangular article made of clay), 34: screw, 35: rotary blade, 36: rotary shaft, 39: test piece, 41: extruding direction, 42: drum diametric direction, 43: drum inner wall, 50: clay extruder, 51: clay, 54: screw, 55: rotary blade, 56: rotary shaft, 58: test piece, 60: clay extruder, 61: clay, 64; screw, 65: rotary blade, 66: rotary shaft, 67: non-continuous rotary blade, 68: test piece, 70: clay extruder, 71: clay, 74: screw, 75: rotary blade, 76: rotary shaft, 77: a plate for distributing kneaded clay, 78: test piece, 79: pore, and 80: honeycomb-like streak.

DESCRIPTION OF THE PREFERRED EMBODIMENT

Hereinafter, an embodiment of the present invention will be described, but needless to say, the present invention is not limited to the following embodiment.

Figure 1:
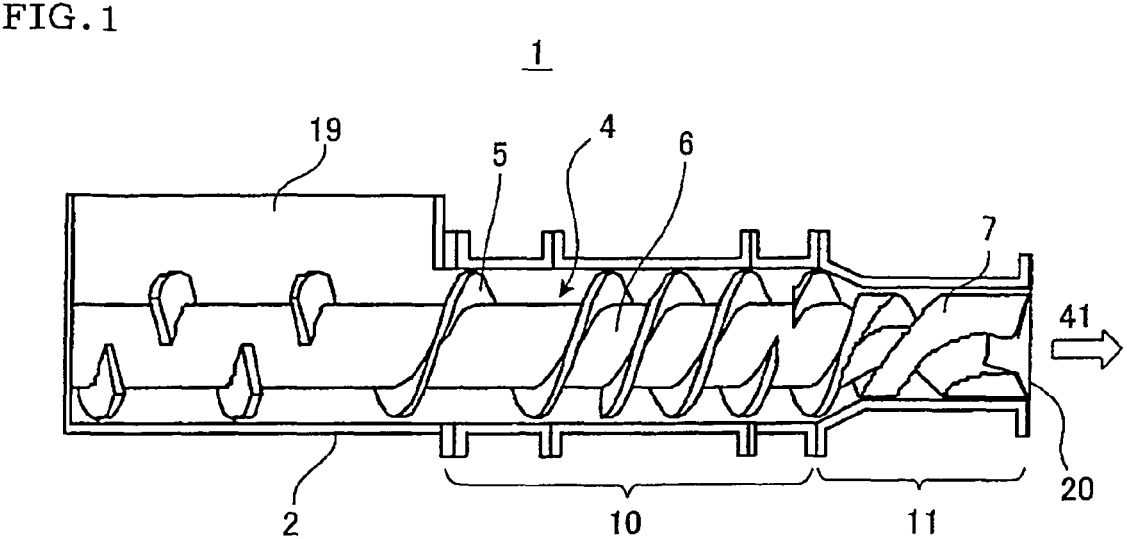
FIG. 1 is a schematic constitution diagram showing a clay extruder of the present invention.

In the present invention, a columnar or a rectangular-columnar article is prepared by using a clay extruder 1. Hereinafter, a schematic constitution of the clay extruder 1 according to the embodiment of the present invention will be described with reference to FIGS. 1 and 7. FIG. 1 is a schematic constitution diagram showing one example of the clay extruder 1. A muddy clay formed by blending a ceramic material with the predetermined amount of a binder or the like and then kneading the material by a kneader or the like is introduced into a supply port 19 of a drum 2. In the drum 2, the clay is kneaded by a screw 4, and fed under pressure to an extrusion port 20 while rotating.

Figure 7:
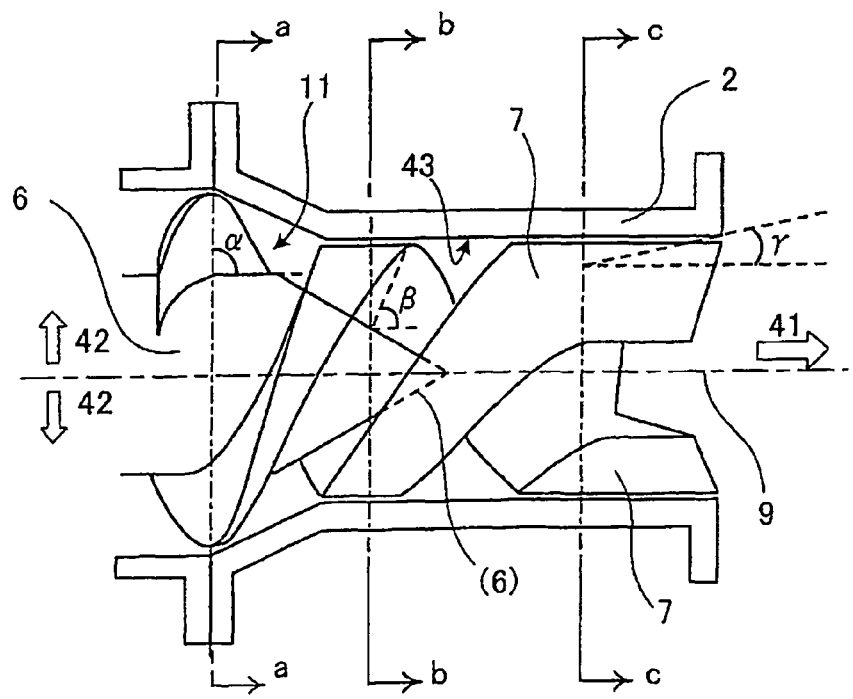
FIG. 7 is a side view schematically showing a rectifying portion of a screw of a clay extruder of the present invention.

FIG. 1 shows the schematic constitution of the clay extruder 1 according to the embodiment of the present invention. In the drawing, the clay extruder 1 has the drum 2 including the supply port 19 into which the clay including the ceramic material is fed, the screw 4 having a rotary shaft 6 and a spiral rotary blade 5 extending along the rotary shaft 6, to feed the clay under pressure while kneading the clay fed into the screw by the rotation of the rotary blade 5, and an extrusion port 20 through which the clay is extruded to form a columnar or a rectangular-columnar article. Furthermore, the screw 4 in the clay extruder 1 of the embodiment of the present invention has a pressure raising portion 10 provided on the side of the supply port 19 in the drum 2 to feed the clay under pressure while kneading the clay in the pressure raising portion, and a rectifying portion 11 provided on the side of the extrusion port 20 in the drum to rectify the clay spirally fed under pressure along the rotary shaft 6 into a columnar shape. In addition, the rectifying portion 11 has a rectifying rotary blade 7 provided so that an angle formed between the sectional shape of the rectifying rotary blade cut along a plane extending along the central line of the rotary shaft 6 and the central line of the rotary shaft gradually decreases, as the rectifying rotary blade comes close to the extrusion port 20. The rectifying rotary blade 7 performs a function of rectifying the spiral clay fed under pressure along the rotary shaft 6 into the columnar shape between the blade and an inner wall of the drum. Furthermore, the interval of the rectifying rotary blade 7 in the rotary shaft direction in the rectifying portion 11 is longer than that of the rotary blade in the rotary shaft direction in the pressure raising portion. FIG. 7 is a partially enlarged schematic explanatory view showing one example of the rectifying portion 11.

Figure 2:
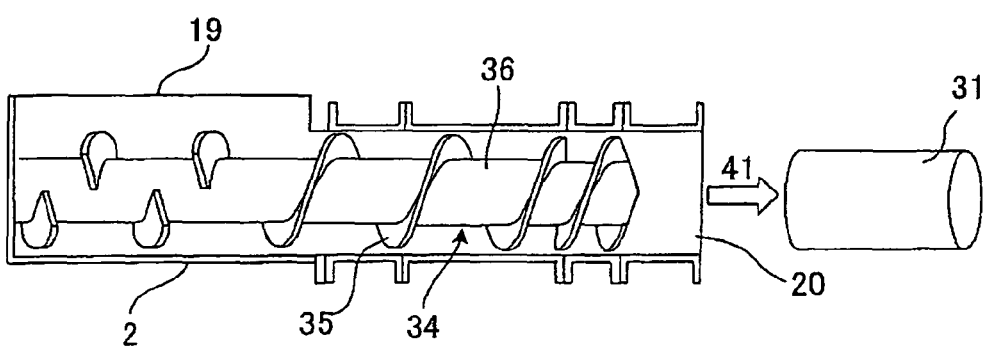
FIG. 2 is a schematic constitution diagram showing a conventional clay extruder.
Figure 3:
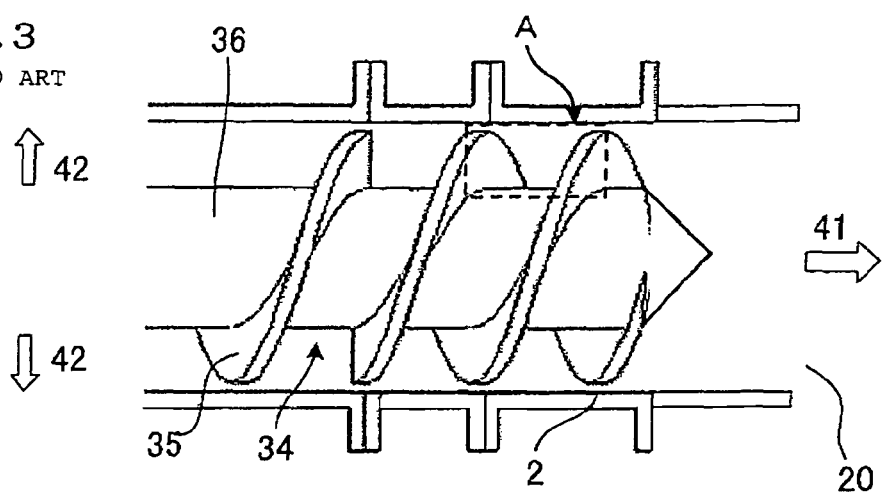
FIG. 3 is a schematic explanatory view showing a tip structure of a screw of the conventional clay extruder.
Figure 4:
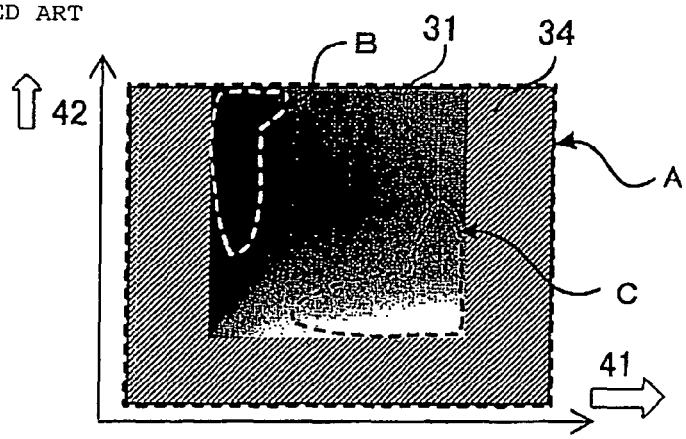
FIG. 4 is a schematic explanatory view showing the density distribution of the clay in a broken line part A of FIG. 3 of the conventional clay extruder.
Figure 5:
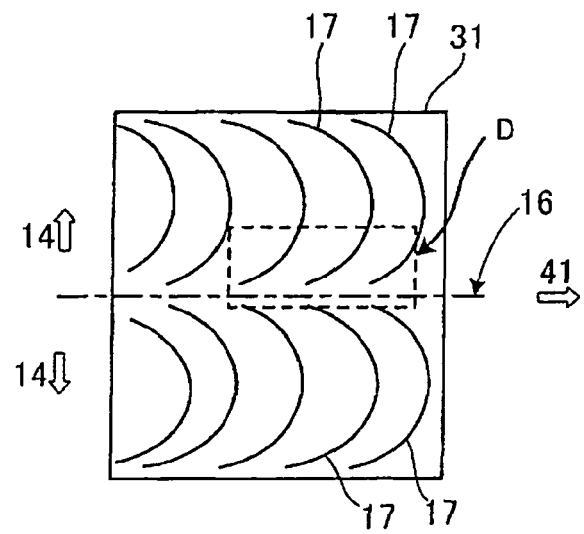
FIG. 5 is a schematic sectional view showing a flow pattern in a columnar or a rectangular-columnar article formed by the conventional clay extruder.
Figure 6:
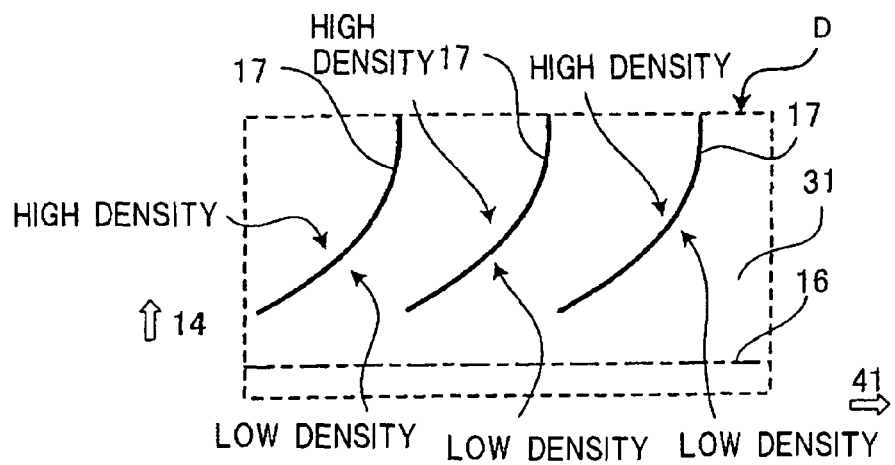
FIG. 6 is a schematic enlarged sectional view showing density differences in a broken line part D of the flow pattern in the columnar article formed by the conventional clay extruder of FIG. 5.

When the material clay is kneaded, fed under pressure and formed into a columnar or columnar rectangular clay article by use of the clay extruder 1 according to the embodiment of the present invention, the generation of a flow pattern due to the density difference of the clay generated in the conventional clay extruder 30 shown in FIGS. 2, 3 can be suppressed. In the clay extruder 1 of the embodiment of the present invention, the screw 4 in the drum 2 is provided with the rotary blade 5. The clay is fed under pressure while kneaded by the rotation of the rotary blade 5 in the pressure raising portion 10. Subsequently, the spiral columnar or columnar rectangular clay article fed under pressure around the rotary shaft 6 in the drum 2 is not laminated, and is gradually converged into one columnar or columnar rectangular clay article by the rectifying rotary blade 7 provided in the rectifying portion 11 of the screw 4. In consequence, the generation of the flow pattern can be suppressed.

Figure 16:
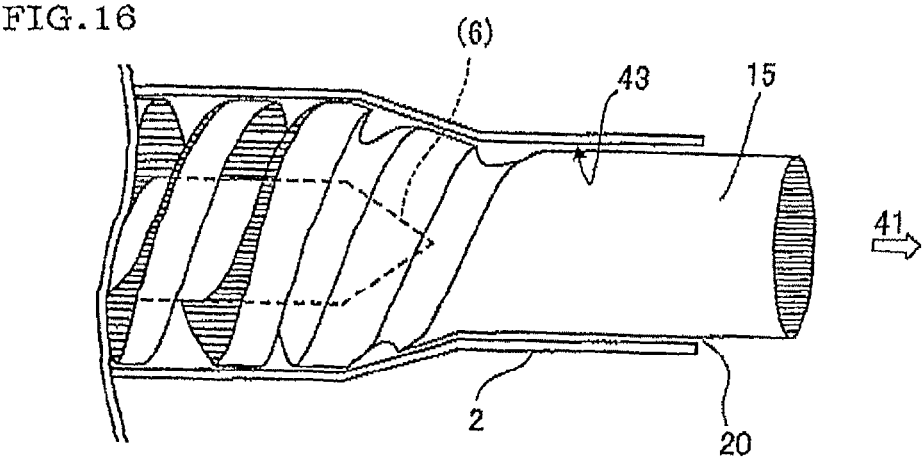
FIG. 16 is a schematic explanatory view showing one example of a clay in a screw tip structure of the clay extruder of the present invention.
Figure 17:
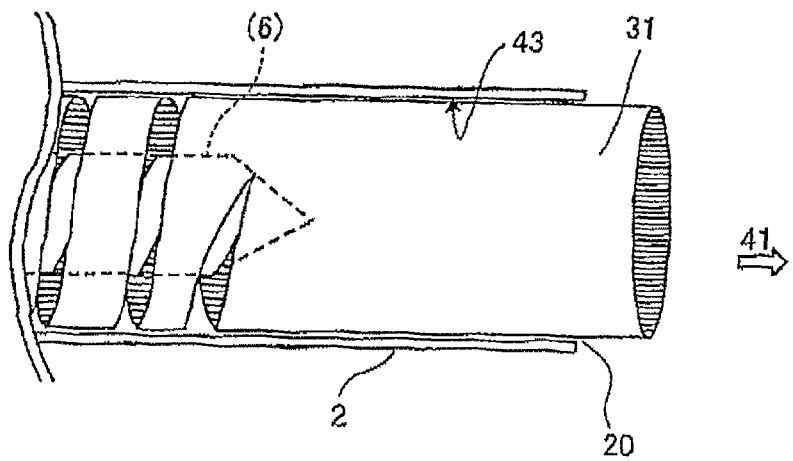
FIG. 17 is a schematic explanatory view showing one example of the clay in the screw tip structure of the conventional clay extruder.

FIG. 16 is a schematic explanatory view showing one example of a clay 15 in a screw tip structure of the clay extruder of the present invention. Moreover, FIG. 17 is a schematic explanatory view showing the clay 31 in the screw tip structure of the conventional clay extruder 30. As shown in FIG. 17, in the conventional clay extruder, the clay 31 keeping the spiral shape in the screw tip structure is fed under pressure as it is, and laminated to form the columnar or a rectangular-columnar article, and hence a flow pattern is formed. However, as shown in FIG. 16, the clay 15 in the screw structure of the clay extruder of the present invention is spirally fed under pressure, but gradually rectified into the columnar shape by the rectifying rotary blade. Therefore, the generation of the flow pattern due to the density difference of the clay can be suppressed.

FIG. 7 is a partially enlarged schematic explanatory view showing the rectifying portion 11 in the embodiment of the clay extruder of the present invention. As shown in FIG. 7, the tip of the rotary shaft 6 is tapered. Moreover, to keep the volume of the drum 2, the inner diameter of the drum 2 and the diameter of the rectifying rotary blade 7 decrease, so that the drum and the rectifying rotary blade become thin. The inner diameter of the drum 2 and the diameter of the rectifying rotary blade 7 can be changed in accordance with the tapered tip shape of the rotary shaft 6, but the present invention does not necessarily conform to this example, and the diameters can be changed in accordance with the desired diameter of the columnar or a rectangular-columnar article, an operation condition such as the rotational speed the clay extruder, the ceramic material included in the clay and the like.

In the rectifying portion 11 shown in FIG. 7, two blade members of the rectifying rotary blade 7 are spirally arranged along the rotary shaft 6, and rotationally symmetrically arranged with respect to the rotary shaft 6. When the rectifying rotary blade is constituted of two blade members and they are rotationally symmetrically arranged, the quality of the clay is constantly effectively stabilized, but this is not necessarily restrictive. For example, when one blade member of the rectifying rotary blade 7 is provided, the clay is integrally formed in the rectifying portion 11, and the homogeneity of the clay is further kept.

Figure 8:
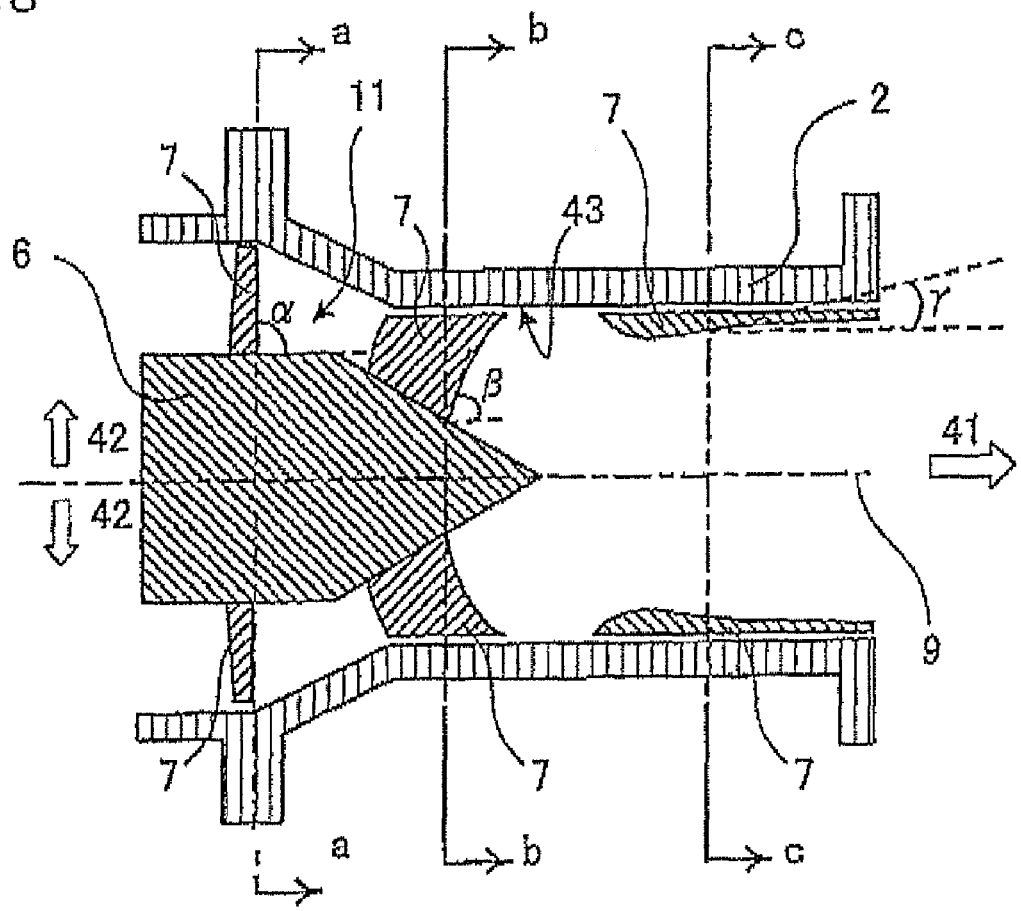
FIG. 8 is a schematic sectional view from a side surface showing the rectifying portion of the screw of the clay extruder of the present invention.

Moreover, as shown in FIG. 7, in the sectional shape of the rectifying rotary blade 7 cut along a plane extending along a rotary shaft central line 9, an angle ($\alpha$, $\beta$ and $\gamma$) formed between the rotary shaft central line 9 and the inner surface of the rectifying rotary blade 7 on the side of the extrusion port 20 gradually decreases to $\alpha$, $\beta$ and $\gamma$ in this order, as the rectifying rotary blade comes close to the extrusion port 20. In a case where the angle formed between the rotary shaft central line 9 and the inner surface of the rectifying rotary blade 7 gradually decreases to $\alpha$, $\beta$ and $\gamma$ in this order, as the rectifying rotary blade comes close to the extrusion port 20, a relation of $\alpha \geq \beta \geq \gamma$ is preferably satisfied. FIG. 8 is a sectional view from a side surface showing the rectifying portion 7 cut along the plane extending along the rotary shaft central line. In consequence, the rectifying rotary blade 7 rectifies the clay spirally moving in the drum 2 so as to gradually extend the clay in the longitudinal direction of the finally obtained a columnar or a rectangular-columnar article, that is, a rotary shaft direction 41 in the drum 2, thereby forming the clay into a columnar shape. Consequently, the formation of the flow pattern due to the density difference of the clay can be decreased.

Furthermore, the interval of the rectifying rotary blade 7 in the direction of the rotary shaft 5 is preferably gradually increased, as the rectifying rotary blade comes close to the extrusion port 20. That is, the feed pitch of the rectifying rotary blade 7 for one cycle is preferably gradually increased, as the rectifying rotary blade comes close to the extrusion port 20. However, in a predetermined range (0 to 30 cm) of a distance from the extrusion port 20, the feed pitch is infinitely large, and hence this range is not included in the above-mentioned interval. By employing this constitution, the formation of the flow pattern can further be reduced.

Figure 9:
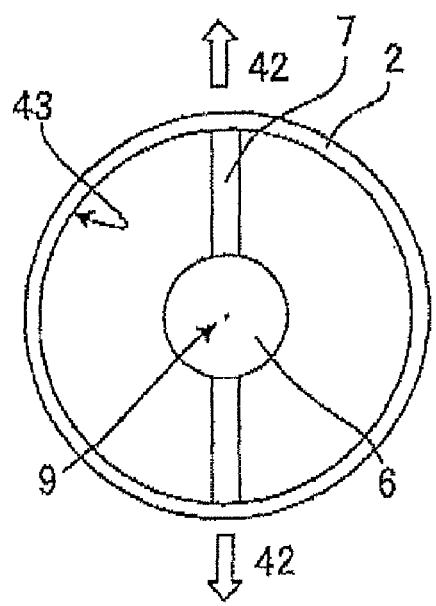
FIG. 9 is a sectional view cut along the a-a line of FIG. 7 and showing a sectional shape cut along a plane vertical to a rotary shaft on the a-a line.
Figure 10:
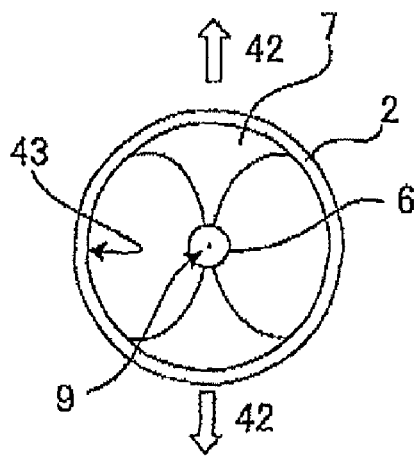
FIG. 10 is a sectional view cut along the b-b line of FIG. 7 and showing the sectional shape cut along the plane vertical to the rotary shaft on the b-b line.
Figure 11:
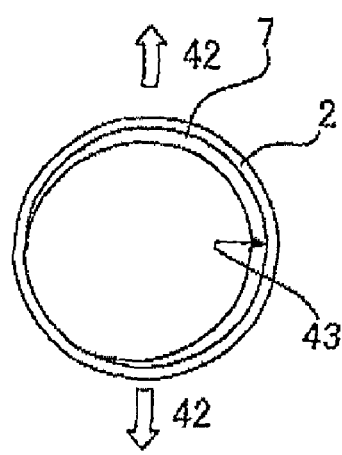
FIG. 11 is a sectional view cut along the c-c line of FIG. 7 and showing the sectional shape cut along the plane vertical to the rotary shaft on the c-c line.

FIGS. 9 to 11 show the transition of the sectional shape of the rectifying rotary blade 7 of FIG. 7 cut along a plane in a direction vertical to the rotary shaft 6. FIG. 9 shows the sectional shape of the rectifying rotary blade cut along the a-a line of FIG. 7 in the direction vertical to the rotary shaft. Moreover, FIG. 10 shows the sectional shape of the rectifying rotary blade cut along the b-b line of FIG. 7 in the direction vertical to the rotary shaft. Furthermore, FIG. 11 shows the sectional shape of the rectifying rotary blade cut along the c-c line of FIG. 7 in the direction vertical to the rotary shaft. FIGS. 9 to 11 show that the rectifying rotary blade 7 is gradually reduced outwardly in the diametric direction of the drum, and expands along an inner wall of the drum, as the rectifying rotary blade comes close to the extrusion port 20 and that the rectifying rotary blade has a circular arc section in the extrusion port 20.

Figure 13:
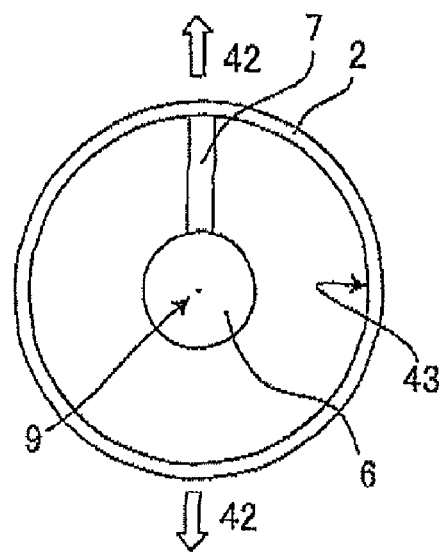
FIG. 13 is a sectional view cut along the a-a line of FIG. 7 and showing the sectional shape cut along the plane vertical to the rotary shaft on the a-a line, in a case where the rectifying rotary blade in FIG. 7 is constituted of one blade member.
Figure 14:
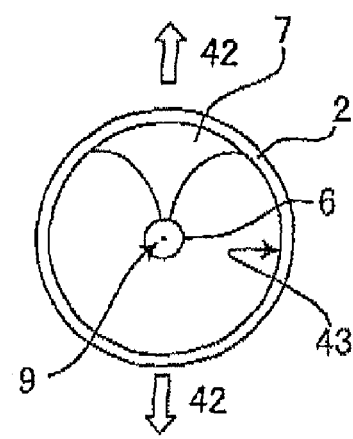
FIG. 14 is a sectional view cut along the b-b line of FIG. 7 and showing the sectional shape cut along the plane vertical to the rotary shaft on the b-b line, in a case where the rectifying rotary blade in FIG. 7 is constituted of one blade member.
Figure 15:
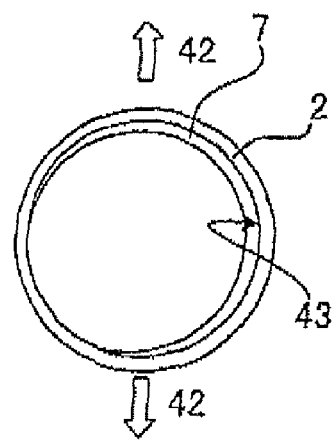
FIG. 15 is a sectional view cut along the c-c line of FIG. 7 and showing another example of the sectional shape cut along the plane vertical to the rotary shaft on the c-c line, in a case where the rectifying rotary blade in FIG. 7 is constituted of one blade member.

FIGS. 13 to 15 show the transition of the sectional shape of the rectifying rotary blade 7 of FIG. 7 cut along the plane vertical to the rotary shaft 6 in the same manner as in FIGS. 9 to 11, in a case where the rectifying rotary blade is constituted of one blade member. FIG. 13 shows the sectional shape of the rectifying rotary blade cut along the a-a line of FIG. 7 in the direction vertical to the rotary shaft, in a case where the rectifying rotary blade 7 of FIG. 7 is constituted of one blade member. Moreover, FIG. 14 shows the sectional shape of the rectifying rotary blade cut along the b-b line of FIG. 7 in the direction vertical to the rotary shaft, in a case where the rectifying rotary blade 7 of FIG. 7 is constituted of one blade member. Furthermore, FIG. 15 shows the sectional shape of the rectifying rotary blade cut along the c-c line of FIG. 7 in the direction vertical to the rotary shaft, in a case where the rectifying rotary blade 7 of FIG. 7 is constituted of one blade member. FIGS. 13 to 15 show that the rectifying rotary blade 7 is gradually reduced outwardly in the diametric direction of the drum, and expands along the inner wall of the drum, as the rectifying rotary blade comes close to the extrusion port 20 and that the rectifying rotary blade has a circular arc section in the extrusion port.

In the clay extruder 1 of the embodiment of the present invention, the volume of the clay fed under pressure to the extrusion port 20 is kept at a constant level for one cycle of the rotation of the rectifying rotary blade 7 in a range of 5 to 30 cm away from the end of the extrusion port 20 to the inside of the drum 2 in the longitudinal direction. At this time, when the volume of the clay fed under pressure to the extrusion port 20, the fluctuations of the volume of the clay fed under pressure per unit time are in a range of 0 to 10%. In consequence, it can be prevented that the clay is starved at the tip of the rectifying rotary blade, laminated in the screw and generates a clay coarse portion. However, in the range of 0 to 5 cm from the end of the extrusion port 20 in the longitudinal direction, the clay substantially has a columnar shape. In this range, the clay hardly needs to be fed under pressure or rectified. Therefore, this range is not included in the range wherein the volume of the clay fed under pressure is kept at constant level.

Figure 12:
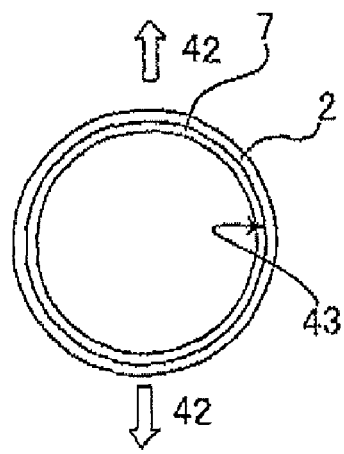
FIG. 12 is a sectional view cut along the c-c line of FIG. 7 and showing another example of the sectional shape cut along the plane vertical to the rotary shaft on the c-c line.

Moreover, the rectifying rotary blade 7 having a circular arc sectional shape in the direction vertical to the rotary shaft as shown in FIGS. 11 and 15, may have an annular sectional shape obtained by connecting both ends of the circular arc shapes, as shown in FIG. 12. Furthermore, when the rectifying rotary blade 7 is constituted of two blade members, the rectifying rotary blade 7 having the circular arc sectional shape in the direction vertical to the rotary shaft as shown in FIG. 11 does not become one circular arc shape from the state of FIG. 10 but may have two circular arc shapes expanding along the drum inner wall.

EXAMPLES

When a columnar or columnar rectangular clay article is formed by extrusion using a clay extruder, for a purpose of suppressing a flow pattern generated by the rotation of a rotary blade provided in a screw, experiments were carried out by using several types of clay extruders. A case where a structure of the screw for feeding a clay under pressure while kneading the clay in a drum was changed and a case where a structure for eliminating a flow pattern from the screw of the drum to an extrusion side was provided were compared with each other and investigated. Hereinafter, clay extruder structures used in Example 1 and Comparative Examples 1 to 4 and obtained results will be described with reference to the drawings.

Example 1

Figure 22:
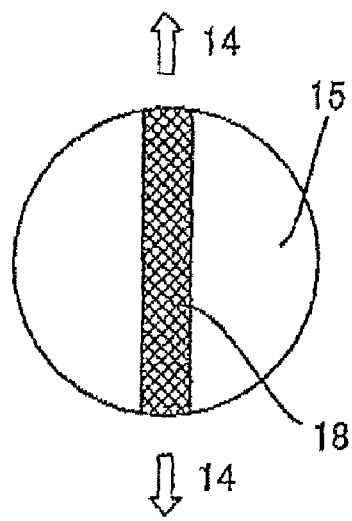
FIG. 22 is a schematic sectional view of a columnar or a rectangular-columnar article viewed from an extrusion port direction, showing the position of a test piece in the clay.
Figure 23:
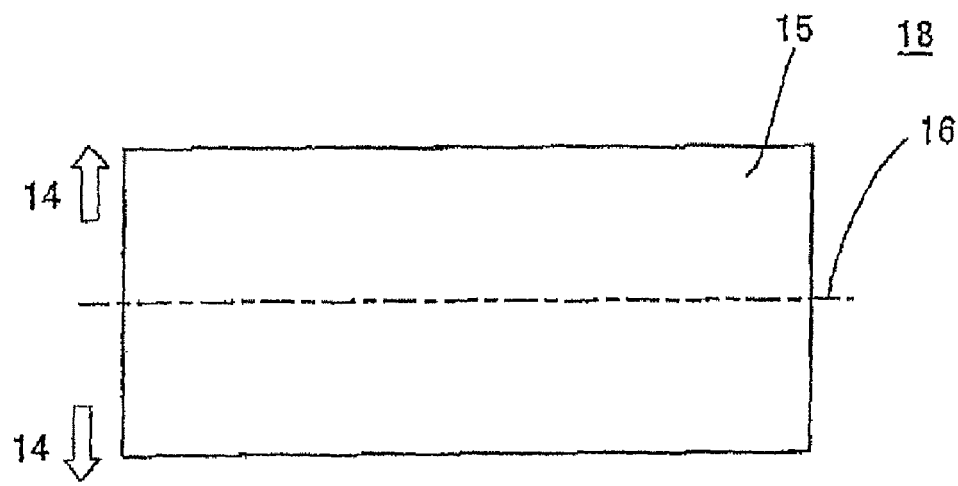
FIG. 23 is a schematic side view of a test piece of the columnar or a rectangular-columnar article obtained by a clay extruder of an example.

In the embodiment of the present invention, a columnar or columnar rectangular clay article was prepared by using a clay extruder 1 including a rectifying rotary blade 7 having the above-mentioned shape shown in FIGS. 1, 7. The center of this columnar or columnar rectangular clay article was cut as a test piece 18 in parallel with an extruding direction 41 as shown in FIG. 22, and the cut face of the columnar or columnar rectangular clay article was observed. FIG. 23 shows a schematic side view of the test piece 18 of Example 1. Arrows in FIG. 23 show a diametric direction 14 of the columnar or a rectangular-columnar article. As shown in FIG. 23, any non-uniform streak was not seen in the test piece 18 of the columnar or a rectangular-columnar article. A state in which both ends of this test piece were held and bent was observed to carry out a bending test, but the test piece uniformly extended, and any crack was not generated.

Comparative Example 1

Figure 24:
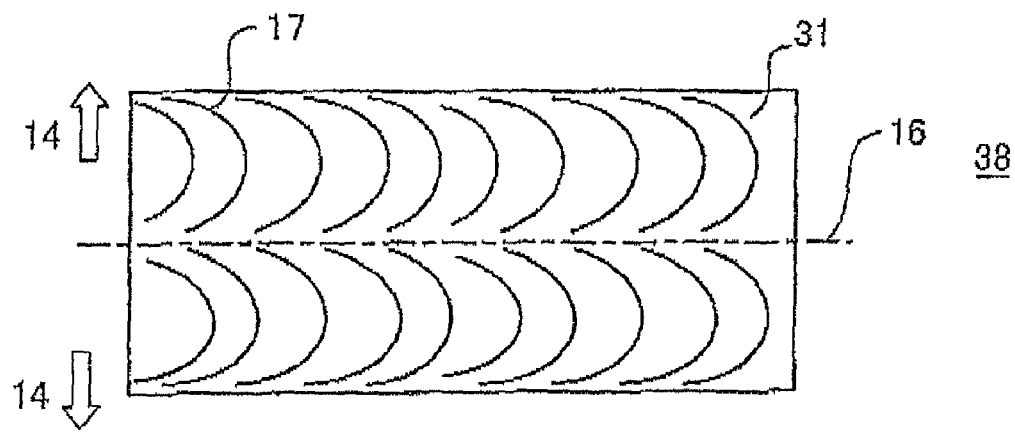
FIG. 24 is a schematic side view of a test piece of the columnar or a rectangular-columnar article obtained by a clay extruder of Comparative Example 1.

As Comparative Example 1, a columnar or columnar rectangular clay article 31 was prepared by using a conventional clay extruder 30 shown in FIG. 2 and FIG. 3 showing an enlarged part. In the same manner as in Example 1, the center of the columnar or columnar rectangular clay article 31 was cut as a test piece 38 in parallel with an extruding direction 41, and the section of the test piece 38 of the columnar or columnar rectangular clay article 31 was observed. FIG. 24 shows the test piece 38 of the columnar or columnar rectangular clay article 31 obtained by using the clay extruder 30 of Comparative Example 1. As can be confirmed with the test piece 38 shown in FIG. 24, a flow pattern 17 formed in the coarse portion of the clay 31 were clearly confirmed. Moreover, when the test piece 38 of the columnar or columnar rectangular clay article 31 obtained by the clay extruder 30 of Comparative Example 1 was subjected to a bending test similar to that of Example 1, the test piece 38 broke down along the flow pattern 17. In consequence, it has been confirmed that the columnar or a rectangular-columnar article has low integral properties (homogeneity) in the portion where the flow pattern 17 is generated.

Comparative Example 2

Figure 18:
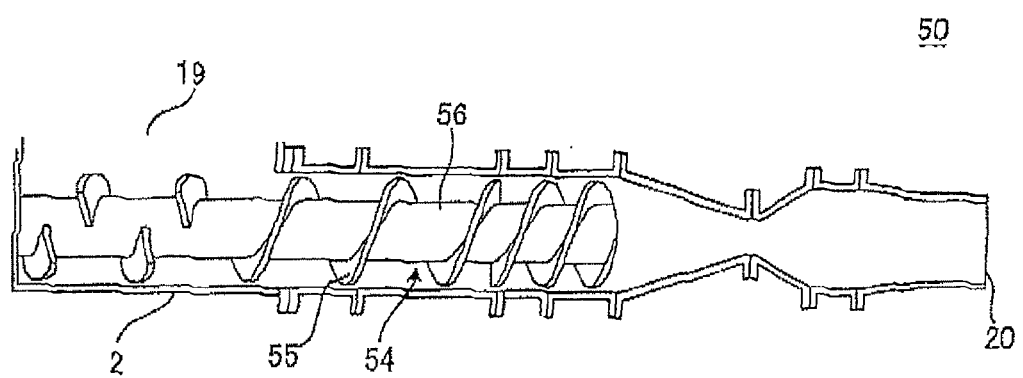
FIG. 18 is a schematic constitution diagram showing a clay extruder of Comparative Example 2.
Figure 25:
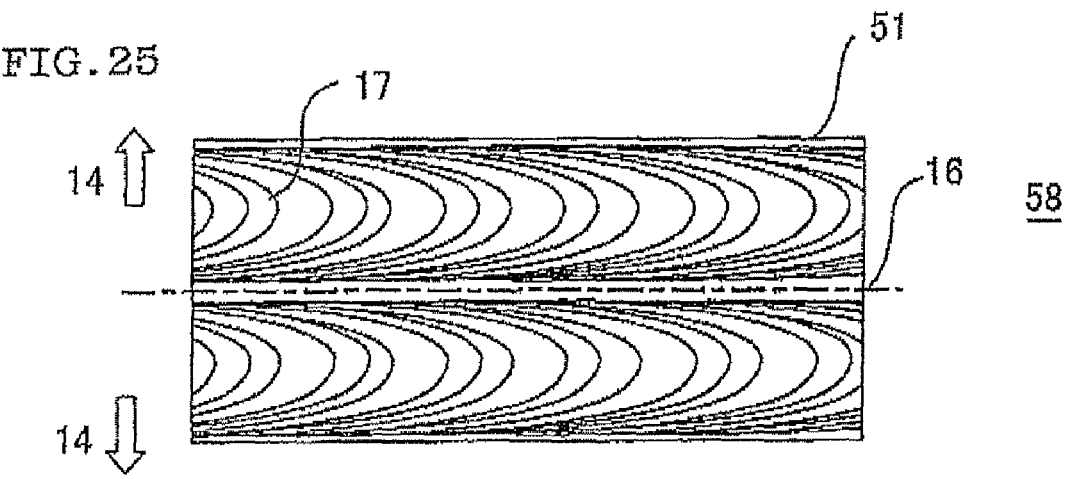
FIG. 25 is a schematic side view of a test piece of the columnar or a rectangular-columnar article obtained by the clay extruder of Comparative Example 2.

To solve the problem of Comparative Example 1, a clay extruder 50 shown in FIG. 18 was used, and the inner diameter of a drum 2 was reduced and enlarged in a tip portion from a screw 54, to try the elimination of a flow pattern generated in a columnar or columnar rectangular clay article. FIG. 25 shows a test piece 58 of a columnar or columnar rectangular clay article 51 obtained by using the clay extruder 50 of Comparative Example 2. A flow pattern 17 extended and changed in an extruding direction, but the flow pattern 17 was not eliminated. When the test piece 58 of the columnar or columnar rectangular clay article 51 obtained by the clay extruder 50 of Comparative Example 2 was subjected to a bending test similar to that of Example 1, the test piece 58 broke down in a flow pattern portion.

Comparative Example 3

Figure 19:
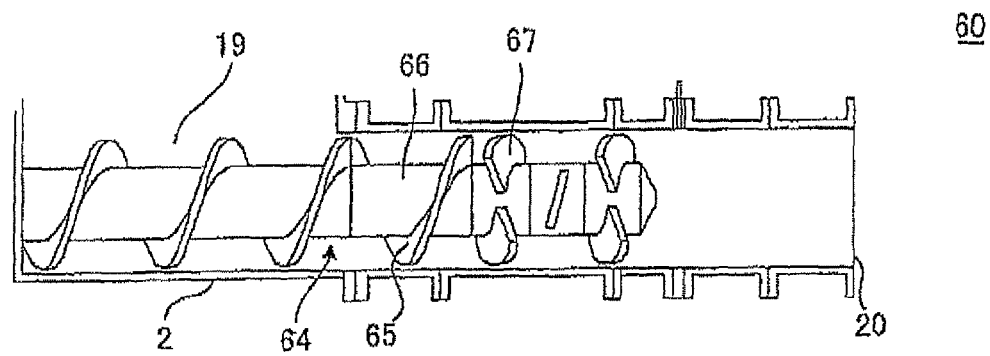
FIG. 19 is a schematic constitution diagram showing a clay extruder of Comparative Example 3.
Figure 26:
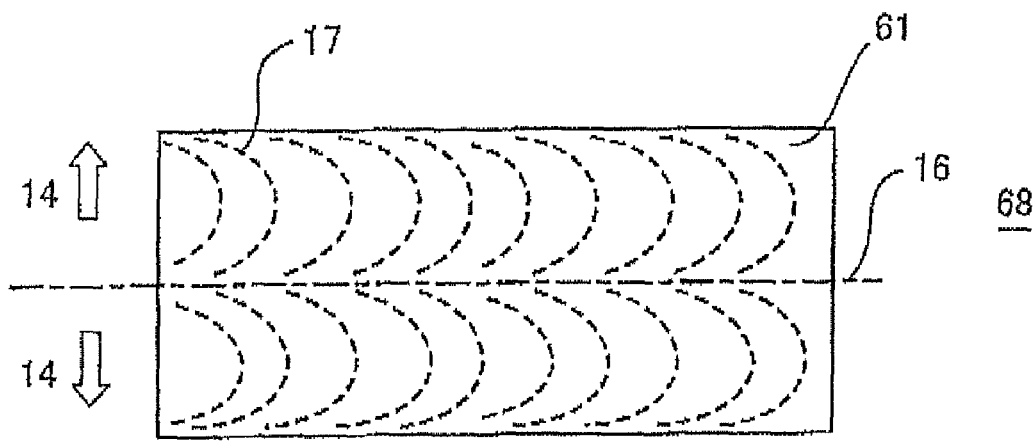
FIG. 26 is a schematic side view of a test piece of the columnar or a rectangular-columnar article obtained by the clay extruder of Comparative Example 3.

To improve Comparative Example 1, as shown in a clay extruder 60 of FIG. 19, as a rotary blade at the tip of a screw 64, a non-continuous rotary blade 67 was used, and the re-kneading of a clay at the screw tip and the integrating of the clay were tried. FIG. 26 shows a test piece 68 of a columnar or columnar rectangular clay article 61 obtained by using the clay extruder 60 of Comparative Example 3. As shown in FIG. 26, a flow pattern 17 was thinned, but still remained. When the test piece 68 of the columnar or columnar rectangular clay article 61 obtained by the clay extruder 60 of Comparative Example 3 was subjected to a bending test similar to that of Example 1, the test piece 68 did not break down along the flow pattern, but a cut was partially generated along the flow pattern 17.

Comparative Example 4

Figure 20:
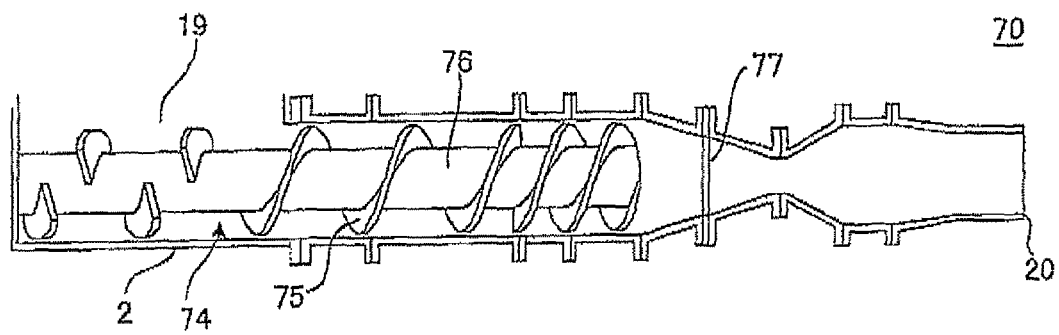
FIG. 20 is a schematic constitution diagram showing a clay extruder of Comparative Example 4.
Figure 21:
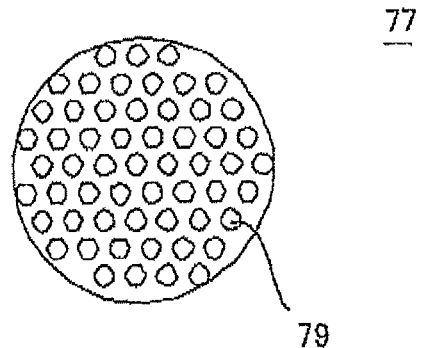
FIG. 21 is a schematic plan view showing a plate for distributing kneaded clay.
Figure 27:
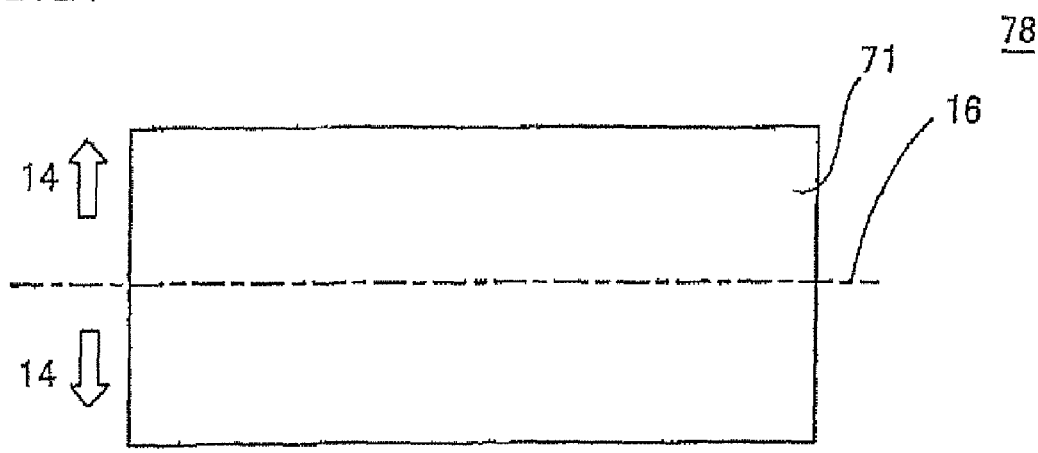
FIG. 27 is a schematic side view of a test piece of the columnar or a rectangular-columnar article obtained by the clay extruder of Comparative Example 4.
Figure 28:
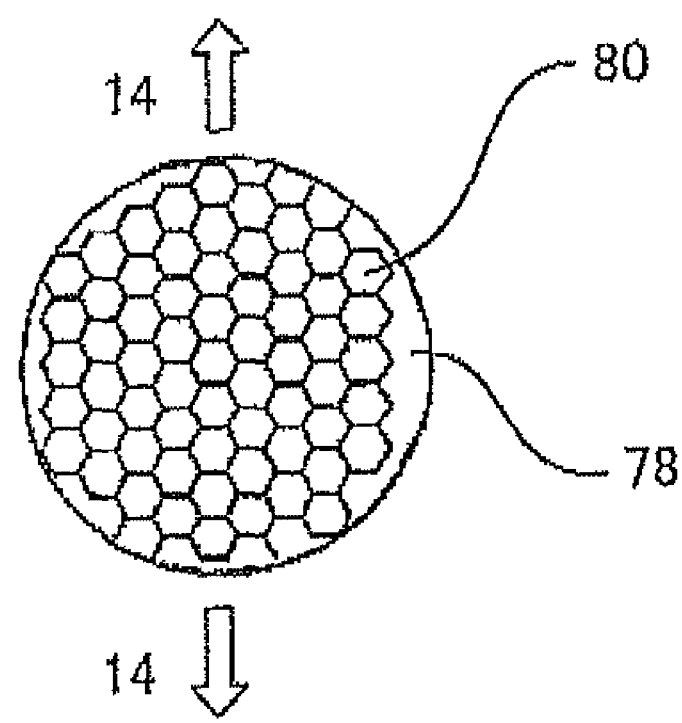
FIG. 28 is a schematic sectional view of the columnar or a rectangular-columnar article obtained by the clay extruder of Comparative Example 4.

To improve Comparative Example 1, as shown in a clay extruder 70 of FIG. 20, a plate for distributing kneaded clay 77 including a plurality of pores 79 as shown in FIG. 21 was installed at a position shown in FIG. 20 in a drum 2 on an extrusion port side from the tip of a screw 74, to try the elimination of a flow pattern. FIG. 27 shows a test piece 78 of a columnar or columnar rectangular clay article 71 obtained by using the clay extruder 70 of Comparative Example 4. As a result, any flow pattern was not generated. However, when this columnar or columnar rectangular clay article was cut along a plane vertical to an extruding direction and a section shown in FIG. 28 was observed, honeycomb-like streaks 80 were seen in the columnar or columnar rectangular clay article 78. When the test piece 78 of the columnar or columnar rectangular clay article obtained by the clay extruder 70 of Comparative Example 4 was subjected to a bending test similar to that of Example 1, the test piece 78 broke down along the honeycomb-like streaks 80.

A clay extruder of the present invention can preferably be applied to the preparation of a columnar or a rectangular-columnar article including a ceramic material, especially for use in the forming of a ceramic honeycomb structure. Moreover, the unevenness of the density of a clay in a drum can be prevented to prepare a columnar or a rectangular-columnar article having excellent homogeneity, and hence the clay extruder can preferably be utilized in not only the forming of the ceramic honeycomb structure but also the preparation of another forming a columnar or a rectangular-columnar article.

What is claimed is:

1. A clay extruder comprising:

a drum including a supply port for feeding a clay, an extrusion port through which the clay is extruded to form a columnar or a rectangular-columnar article, and a screw having a rotary shaft and a spiral rotary blade extending along the rotary shaft which feeds the clay under pressure while kneading the clay fed into the screw by a rotation of the rotary blade, wherein the screw has a pressure raising portion in a supply port side of the drum to feed the clay under pressure while kneading the clay, and a rectifying portion in an extrusion port side of the drum to rectify the clay fed under pressure along the rotary shaft into the columnar shape, the rectifying portion has a rectifying rotary blade configured so that a rotary blade angle gradually decreases as the rectifying rotary blade approaches the extrusion port, the rotary blade angle being formed between a face of the rectifying rotary blade that faces the extrusion port and a central line of the rotary shaft the rectifying rotary blade extends beyond an end of the rotary shaft in a direction toward the extrusion port and is configured so that the sectional shape of the rectifying rotary blade cut along the direction perpendicular to the rotary shaft is gradually reduced outwardly in a diametric direction of the drum, and expands along an inner wall of the drum, as the rectifying rotary blade comes close to the extrusion port, the end of the rotary shaft is tapered, and an interval of the rectifying rotary blade in a rotary shaft direction is longer than that of the rotary blade of the pressure raising portion in the rotary shaft direction.

2. The clay extruder according to claim 1, wherein the interval of the rectifying rotary blade in the rotary shaft direction gradually increases, as the rectifying rotary blade comes close to the extrusion port.

3. The clay extruder according to claim 1, wherein the rectifying rotary blade comprises two blade members configured so that the sectional shapes of the blade members cut along the direction perpendicular to the rotary shaft are rotationally symmetrical with respect to the central line of the rotary shaft.

4. The clay extruder according to claim 3, wherein the rectifying rotary blade is configured so that the sectional shape of the rectifying rotary blade cut along the direction perpendicular to the rotary shaft is gradually reduced outwardly in a diametric direction of the drum, and expands along an inner wall of the drum, as the rectifying rotary blade comes close to the extrusion port.

5. The clay extruder according to claim 1, wherein the rectifying rotary blade is configured so that the sectional shape of the rectifying rotary blade cut along the direction perpendicular to the rotary shaft is gradually reduced outwardly in a diametric direction of the drum, and expands along the inner wall of the drum, as the rectifying rotary blade comes close to the extrusion port, and so that the sectional shape becomes a circular arc in the extrusion port.

6. The clay extruder according to claim 3, wherein the rectifying rotary blade is provided so that the sectional shape of the rectifying rotary blade cut along the direction perpendicular to the rotary shaft is gradually reduced outwardly in a diametric direction of the drum, and expands along the inner wall of the drum, as the rectifying rotary blade comes close to the extrusion port, and so that the sectional shape becomes a circular arc in the extrusion port.

7. The clay extruder according to claim 1, wherein the rectifying rotary blade is configured so that a volume of the clay fed under pressure to the extrusion port is kept at a constant level for one cycle of the rotation of the rectifying rotary blade in a range of 5 to 30 cm from the extrusion port.

* * * * *